US007434261B2

(12) United States Patent (10) Patent No.: US 7,434,261 B2
Costea et al. (45) Date of Patent: Oct. 7, 2008

(54) SYSTEM AND METHOD OF IDENTIFYING THE SOURCE OF AN ATTACK ON A COMPUTER NETWORK

(75) Inventors: Mihai Costea, Redmond, WA (US); David W Aucsmith, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 658 days.

(21) Appl. No.: 10/951,173

(22) Filed: Sep. 27, 2004

(65) Prior Publication Data

US 2006/0070130 A1 Mar. 30, 2006

(51) Int. Cl.
*G06F 11/00* (2006.01)
(52) U.S. Cl. .............................. 726/22; 726/23; 726/24
(58) Field of Classification Search ............. 726/22–24, 726/26; 713/188
See application file for complete search history.

(56) References Cited

U.S. PATENT DOCUMENTS 5,414,833 A * 5/1995 Hershey et al. ............... 726/22
6,629,267 B1 9/2003 Glerum et al.
6,681,348 B1 1/2004 Vachon
6,715,084 B2 * 3/2004 Aaron et al. ................... 726/23

OTHER PUBLICATIONS

Roberts, P.F., "Patrolling an Always-On Network: Increased Crime-Fighting Systems Demand More Effective Enterprise Security," *InfoWorld*, Jul. 23, 2004 [retrieved Sep. 23, 2004].

* cited by examiner

*Primary Examiner*—Hosuk Song
(74) *Attorney, Agent, or Firm*—Christensen O'Connor Johnson Kindness PLLC

(57) ABSTRACT

The present invention provides a system and method of tracing the spread of computer malware in a communication network. One aspect of the present invention is a method that traces the spread of computer malware in a communication network. When suspicious data characteristic of malware is identified in a computing device connected to the communication network, the method causes data that describes the state of the computing device to be stored in a database. After a specific attack against the communication network is confirmed, computing devices that are infected with the malware are identified. Then, the spread of the malware between computing devices in the communication network is traced back to a source.

20 Claims, 4 Drawing Sheets

SYSTEM AND METHOD OF IDENTIFYING THE SOURCE OF AN ATTACK ON A COMPUTER NETWORK

FIELD OF THE INVENTION

The present invention relates to computing devices and more particularly to protection of computing devices against malware.

BACKGROUND OF THE INVENTION

As more and more computers, and other computing devices, are inter-connected through various networks, such as the Internet, computer security has become increasingly more important, particularly from invasions or attacks delivered over a network or over an information stream. As those skilled in the art will recognize, these attacks come in many different forms, including, but certainly not limited to, computer viruses, computer worms, system component replacements, denial of service attacks, even misuse/abuse of legitimate computer system features, all of which exploit one or more computer system vulnerabilities for illegitimate purposes. While those skilled in the art will realize that the various computer attacks are technically distinct from one another, for purposes of the present invention and for simplicity in description, all malicious computer programs that spread on computer networks, such as the Internet, will be generally referred to hereinafter as computer malware, or more simply, malware.

When a computer system is attacked or "infected" by computer malware, the adverse results are varied, including disabling system devices; erasing or corrupting firmware, applications, or data files; transmitting potentially sensitive data to another location on the network; shutting down the computer system; or causing the computer system to crash. Yet another pernicious aspect of many, though not all, computer malware is that an infected computer system is used to infect other systems.

A traditional defense against computer malware, and particularly computer viruses and worms, is anti-virus software. Generally, anti-virus software scans incoming data, arriving over a network, looking for identifiable patterns associated with known computer malware. Upon detecting a pattern associated with a known computer malware, the anti-virus software may respond by removing the computer virus from the infected data, quarantining the data, or deleting the infected incoming data. Unfortunately, anti-virus software typically works with known, identifiable computer malware. Frequently, this is done by matching patterns within the data to what is referred to as a "signature" of the malware. One of the core deficiencies in this malware detection model is that an unknown computer malware may propagate unchecked in a network until a computer's anti-virus software is updated to identify and respond to the malware.

FIG. 1 is a pictorial diagram illustrating an exemplary networked environment 100 over which computer malware is commonly distributed. As shown in FIG. 1, the typical exemplary networked environment 100 includes a plurality of computing devices 102-108 all inter-connected via a communication network 110, such as an intranet or via a larger communication network including the global TCP/IP network commonly referred to as the Internet. For whatever reason, a malicious party on a computing device connected to the network 110, such as computing device 102, develops a computer malware 112 and releases it on the network. The released computer malware 112 is received by, and infects, one or more computing devices, such as computing device 104, as indicated by arrow 114. As is typical with many computer malware, once infected, computing device 104 is used to infect other computing devices, such as computing device 106 as indicated by arrow 116, which in turn infects yet other computing devices, such as computing device 108 as indicated by arrow 118. Clearly, due to the speed and reach of the modern computer networks, a computer malware 112 can "grow" at an exponential rate, and quickly become a local epidemic that quickly escalates into a global computer pandemic.

In light of the above-identified problems, it would be beneficial to law enforcement organizations, anti-virus vendors, and other entities to have a system and method of tracing the release of malware in a communication network.

SUMMARY OF THE INVENTION

The present invention is generally directed to tracing the spread of computer malware from computing devices that are infected to a computing device where the infection originated. One aspect of the present invention is a method that traces the spread of computer malware in a communication network. When suspicious data characteristic of malware is identified in a computing device connected to the communication network, the method causes data that describes the state of the computing device to be stored in a database. After a specific attack against the communication network is confirmed, computing devices that are infected with the malware are identified. Then, the spread of the malware between computing devices in the communication network is traced back to a source.

In accordance with further aspects of the present invention, a method for collecting the memory state of a client computing device when anti-virus software identifies suspicious data characteristic of malware on the client computing device is disclosed. The anti-virus software may report the suspicious data using a call to an application programming interface ("API"). The API call may cause the memory contents of the client computing device, typically in the form of a crash dump file, to be transmitted to a server computing device. The server computing device is configured to maintain a database designed to collect crash dump files from a plurality of client computing devices. Also, the API call may cause additional information to be transmitted to the server computing device including information used to confirm the spread of malware in a communication network.

In yet another aspect of the present invention, a computer-readable medium may be provided with contents that cause a computing system to operate in accordance with the methods described herein.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The present invention provides a system and method of tracing the spread of computer malware in a communication network. When suspicious data characteristic of malware is identified in a computing device connected to the communication network, the present invention causes data that describes the state of the computing device to be stored in a database. After a specific attack against the communication network is confirmed, computing devices that are infected with the malware are identified through an analysis of the data stored in the database. Then, the spread of the malware between computing devices is traced back to the source.

Although the present invention will primarily be described in the context of tracing malware released on the Internet, those skilled in the relevant art and others will appreciate that the present invention is also applicable in other areas of computer networking and software engineering. The following description first provides an overview of a system in which the present invention may be implemented. Then a method is described that traces the spread of malware from computing devices that are infected to a computing device where the infection originated. The illustrative examples provided herein are not intended to be exhaustive or to limit the invention to the precise forms disclosed. Similarly, any steps described herein may be interchangeable with other steps, or combinations of steps, in order to achieve the same result.

Figure 2:
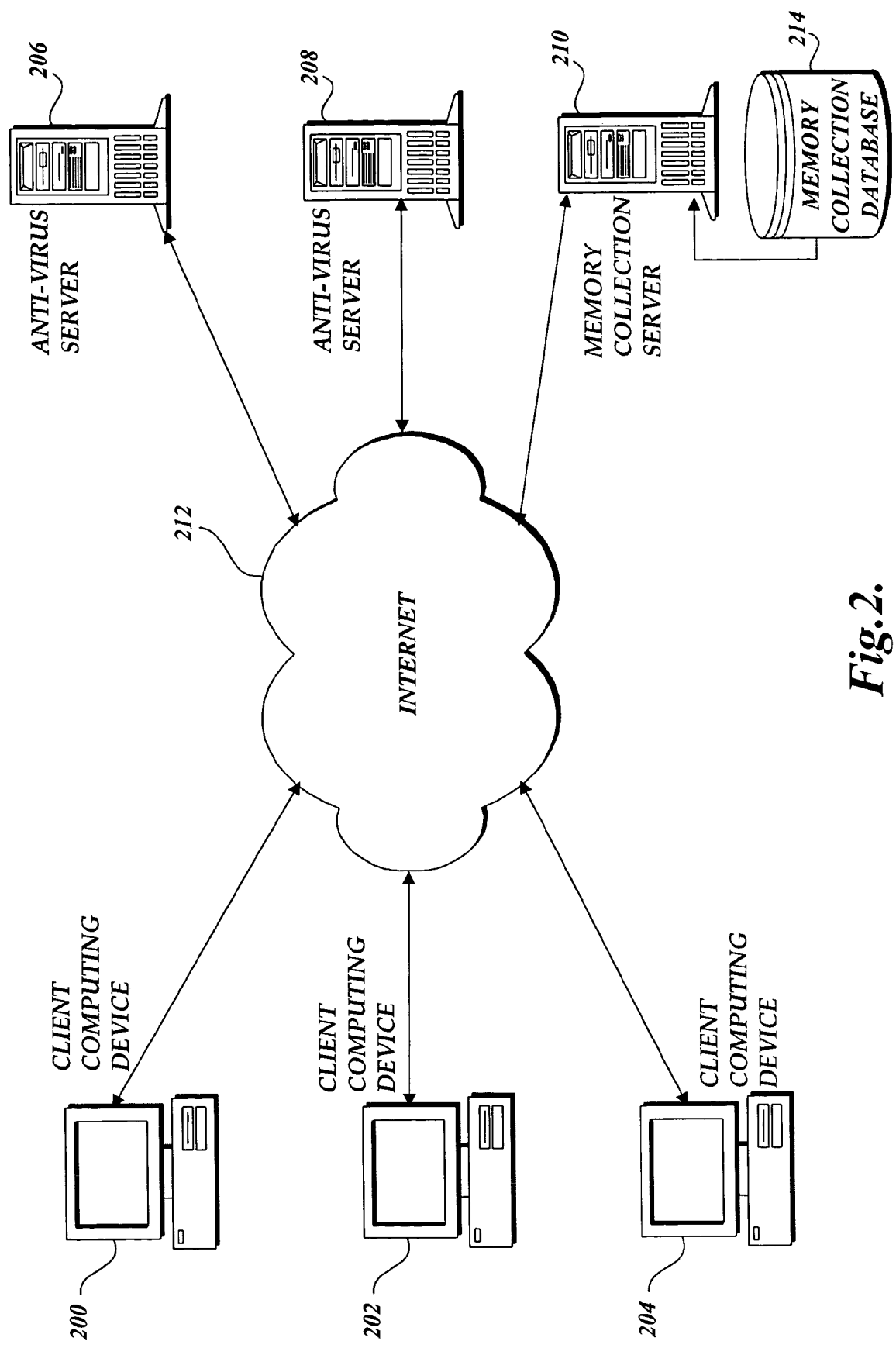
FIG. 2 is a pictorial depiction of an exemplary network environment in which embodiments of the present invention may be implemented.

Referring to FIG. 2, the following is intended to provide an exemplary overview of one suitable computer environment in which the present invention may be implemented. The illustrated environment comprises a plurality of client computing devices 200, 202, and 204, anti-virus server 206, anti-virus server 208, and memory collection server 210. As illustrated, the client computing devices 200, 202, and 204, may be communicatively connected to the anti-virus servers 206 and 208 and the memory collection server 210 via the Internet 212. As known to those skilled in the art and others, the computing devices illustrated in FIG. 2 may be configured to exchange documents, commands, and other types of data.

As illustrated in FIG. 2, the memory collection server 210 is shown associated with the memory collection database 214. As known to those skilled in the art and others, existing systems are able to obtain "crash dumps" (sometimes referred to as memory dumps or core dumps) when a failure occurs in a computing device such as client computing devices 200, 202, and 204. Generally described, a crash dump is a record of the memory state of a computing device saved to a file which provides developers with access to data and other information that captures the state of different system components at the time of a crash or failure. A detailed description of one system suitable to obtain a crash dump from a client computing device in response to a failure may be found in commonly assigned U.S. Pat. No. 6,629,267, titled METHOD AND SYSTEM FOR REPORTING A PROGRAM FAILURE, issued Sep. 30, 2003, the content of which is expressly incorporated herein by reference. As known to those skilled in the art and others, after a crash dump is obtained at a database, such as the memory collection database 214, additional data may be requested regarding the state of the client computing device.

The large size of a complete crash dump makes it cumbersome to isolate the computer code that caused the failure because a vast amount of system information must be read. Also, transmission of large files over a network such as the Internet 212 consumes resources and time, reducing the convenience of these types of systems. Therefore, mechanisms have been developed to generate a minidump file, which is an abbreviated record of a crash dump. A detailed description of a system for creating a minidump file from a crash dump is found in commonly assigned U.S. Pat. No. 6,681,348, titled CREATION OF MINI DUMP FILES FROM FULL DUMP FILES, issued Jan. 20, 2004, the content of which is expressly incorporated herein by reference.

As known to those skilled in the art and others, many different software vendors produce anti-virus software. Typically, modern anti-virus software is configured to issue a report when suspicious data characteristic of malware is detected on a client computing device. The report is transmitted from a client computing device to a server computing device such as anti-virus servers 206 and 208 that are associated with anti-virus software vendors. Unfortunately, anti-virus software typically works best with "known," identifiable computer malware. Frequently, identifying known malware is done by matching patterns in reports obtained from client computing devices to a "signature" of the malware. As described in further detail below with reference to FIG. 4, software formed in accordance with the present invention establishes a triggering event other than a failure for transmitting a minidump file from a client computing device to a database that stores data collected from a plurality of client computing devices. For example, anti-virus software may indicate that suspicious data characteristic of malware is stored on a client computing device. In conjunction with the present invention, the anti-virus software may cause a minidump file to be transmitted to the memory collection server 210 which is stored in the memory collection database 214. Also, the anti-virus software may cause additional information to be transmitted to the memory collection server 210 including information that will confirm the spread of malware in the communication network and information that will assist developers in preventing the malware from propagating.

Figure 3:
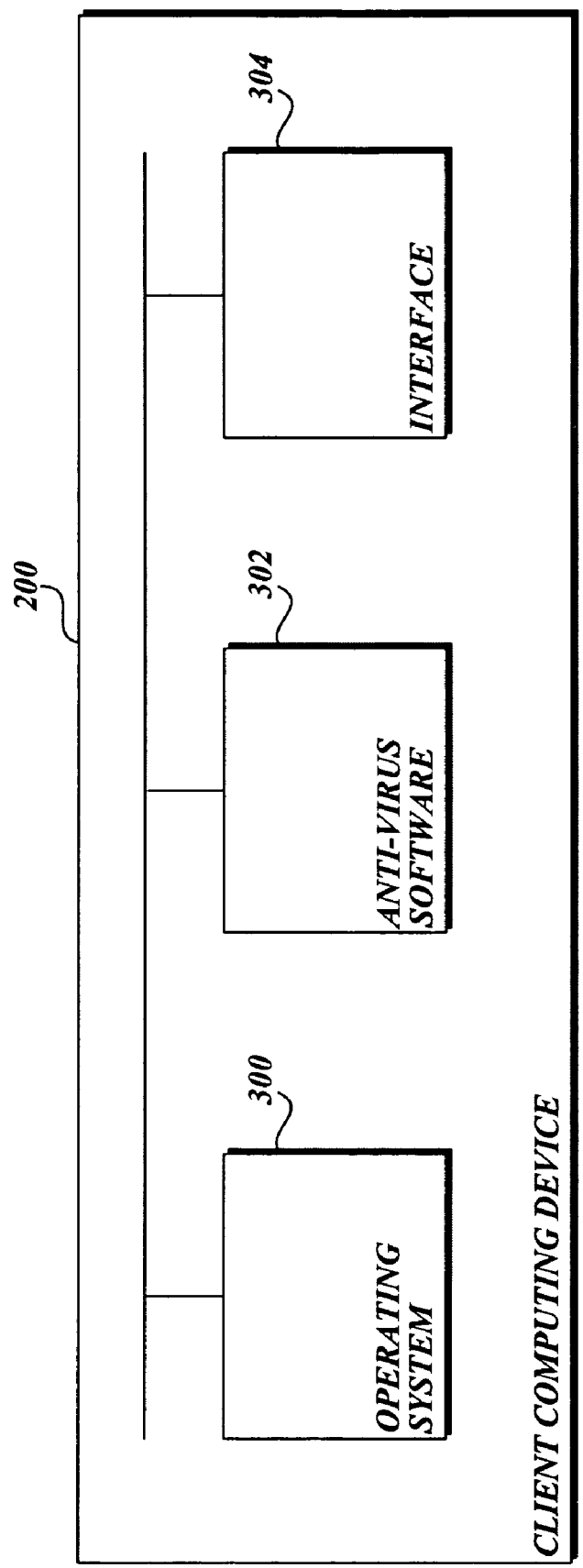
FIG. 3 is a block diagram of a client computing device depicted in FIG. 1 that is suitable to illustrate embodiments of the present invention.

Now, with reference to FIG. 3, components of the client computing device 200 shown in FIG. 2 will be described. In general, client computing devices such as client computing device 200 serve as collection areas where data that describes malware propagating "in the wild" may be obtained. Software executing on the client computing device 200 that is formed in accordance with the present invention provides an interface for transmitting information about malware to the memory collection server 210. As illustrated in FIG. 3 and described in further detail below, the client computing device 200 includes an operating system 300, anti-virus software 302, and an interface 304.

As illustrated in FIG. 3, the client computing device 200 stores an operating system 300 for controlling the general operation of the computing device 200 and providing services and resources requested by application programs such as the anti-virus software 302. The operating system 300 may be a general-purpose operating system that is commercially available such as a Microsoft® operating system, UNIX® operating system, or Linux® operating system. As known to those skilled in the art and others, a general purpose operating system performs basic tasks, such as managing the I/O (input and output) of a computing device and tracking data stored in memory. With regard to the present invention, the operating system 300 generates a minidump file in response to a call that is made to the interface 304. Also, the operating system 300 transmits the minidump file to a remote computing device such as memory collection server 210 that may be used to track the spread of malware in the communication network.

The client computing device 200 also includes anti-virus software 302 designed to detect malware on the client computing device 200 and provide information about the malware to the memory collection server 210. As known to those skilled in the art and others, any one of a number of commercially available anti-virus software packages may be installed on the client computing device 200. As described previously, anti-virus software is most successful when a signature for the malware was previously obtained. For new or otherwise unknown malware, available anti-virus software packages perform heuristic scans designed to detect suspicious data characteristic of malware on a client computing device. In any event, when the anti-virus software 302 indicates that a client computing device is either known to be infected or potentially infected with malware, the anti-virus software provides information to the memory collection server 210 that describes the memory state of the client computing device 200.

As illustrated in FIG. 3, the client computing device 200 also includes an interface 304 that provides a mechanism for application programs such as the anti-virus software 302 to cause a minidump file to be transmitted to the memory collection server 210. On one side, the interface 304 interacts with the anti-virus software 302 and on the other side, the interface 304 interacts with the operating system 300. For example, the anti-virus software 302 may perform a heuristic scan that identifies suspicious data on the client computing device 200. When the scan is complete, the anti-virus software may make a call to the interface 304 to send a minidump file to the memory collection server 210. When the call is received, the interface 304 may issue a command to the operating system 300 that causes the minidump file to be generated and transmitted to the memory collection server 210.

As illustrated in FIG. 3, each component of the client computing device 200, e.g., the operating system 300, the anti-virus software 302, and the interface 304 are interconnected and able to communicate with other components. As known to those skilled in the art, FIG. 3 is a highly simplified example of one computing device 200 capable of performing aspects of the present invention. Actual embodiments of the client computing device 200 will have additional components not illustrated in FIG. 3 or described in the accompanying text. Also, FIG. 3 shows one component architecture for the client computing device 200, but other component architectures are possible. Thus, FIG. 3 should be construed as exemplary and not limiting.

Figure 1:
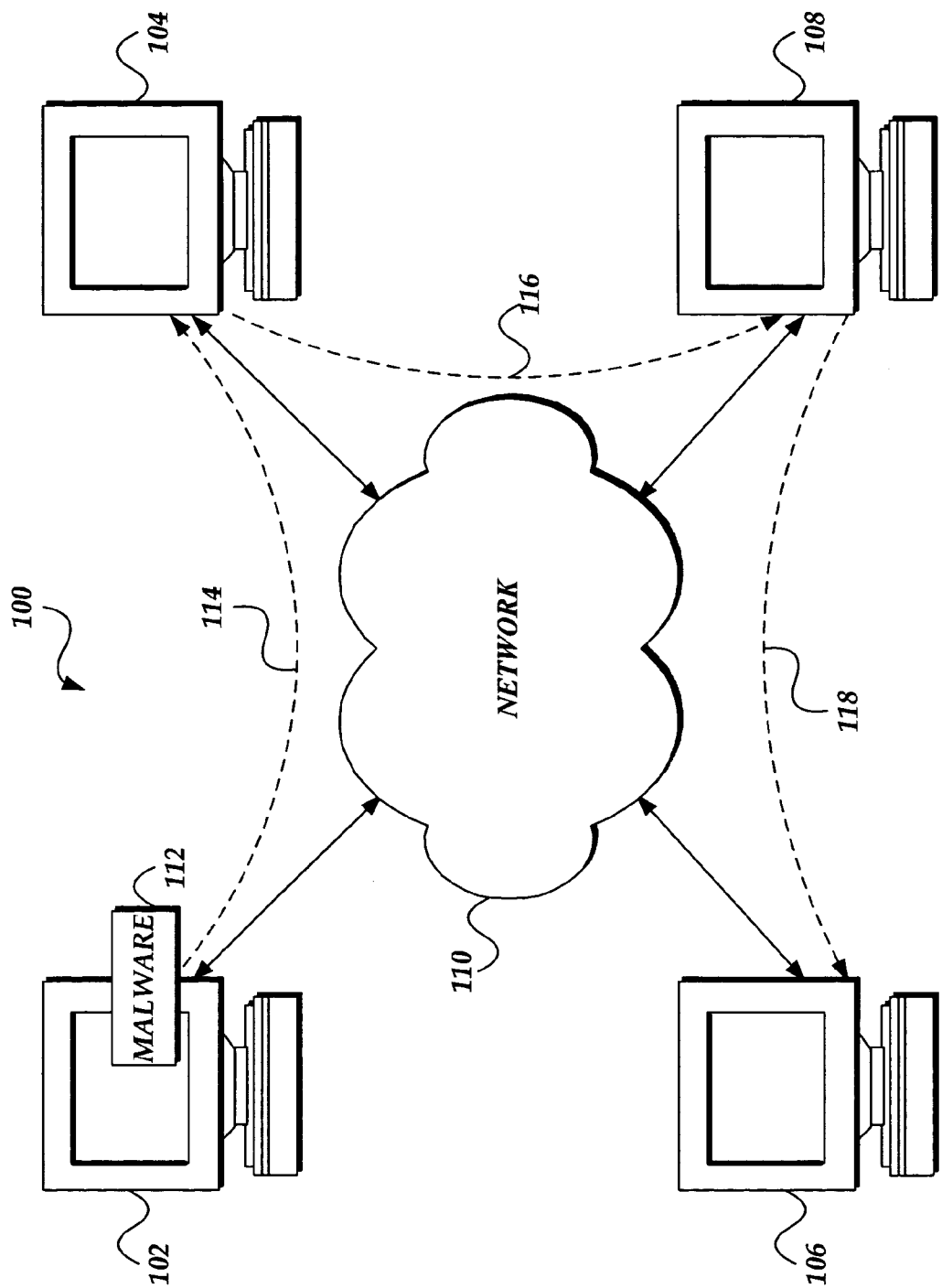
FIG. 1 is a pictorial diagram illustrating an exemplary network environment, as found in the prior art, over which a computer malware is commonly distributed.
Figure 4:
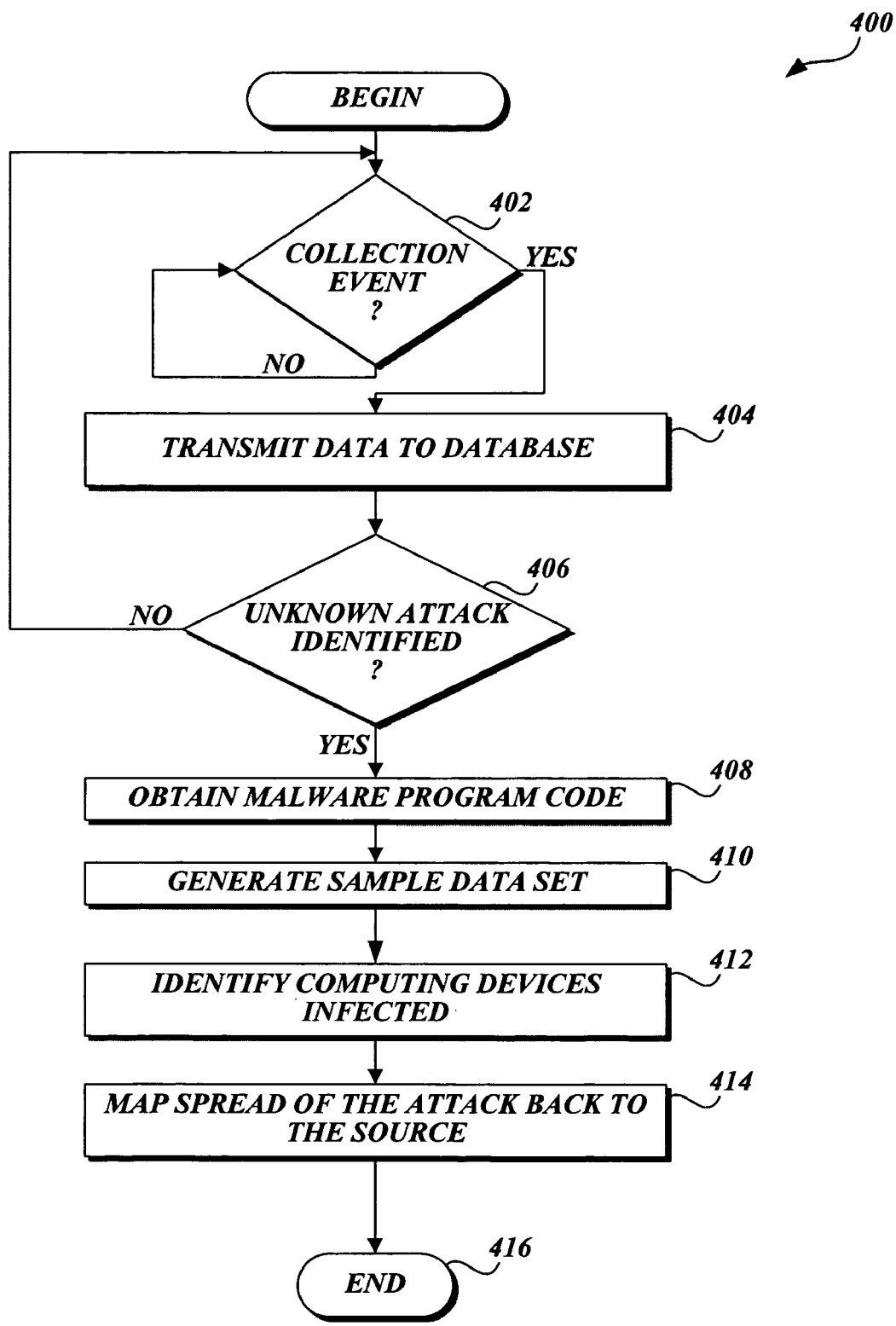
FIG. 4 is a flow diagram of an exemplary method for tracing the spread of malware from infected computing devices to a computing device where the malware originated in accordance with the present invention.

FIG. 4 is a flow diagram illustrating one exemplary embodiment of a method 400 formed in accordance with the present invention. In summary, the method 400 traces the spread of computer malware in a communication network. When suspicious data characteristic of malware is detected in a computing device connected to a communication network, the method 400 sends data that represents the memory state of the computing device to a database. After a specific attack against the communication network is confirmed, computing devices that are infected with the malware are identified using data stored in the database. Then, the spread of the malware between computing devices is traced back to the source. With continuing reference to FIGS. 1-3 and the accompanying descriptions, an exemplary method 400 illustrated in FIG. 4 will now be described.

At block 402 the method 400 remains idle and waits for an event that triggers the collection of data from a computing device such as client computing devices 200, 202, and 204. When anti-virus software detects data characteristic of malware on a client computing device, the method 400 receives notice of the detection. In one embodiment of the present invention, the anti-virus software indicates that suspicious data has been detected by issuing an API call to the operating system executing on a client computing device. As known to those skilled in the art and others, anti-virus software is able to pass information to the operating system when making an API call.

At block 404, the method 400 transmits data to a computer system designed to assist developers trace the spread of malware such as memory collection server 210 (FIG. 2). As described previously with reference to FIGS. 1 and 2, a plurality of client computing devices may be connected to a communication network. Data that allows developers to track the spread of the malware throughout the communication network is aggregated at a single location. For example, the collection event that occurred at block 402 may cause a minidump file to be transmitted from the client computing device where the suspicious data was detected to a remote computer system designed to assist developers trace the spread of malware (i.e., memory collection server 210).

The anti-virus software may cause additional data in addition to a mini-dump file to be transmitted to a computer system designed to assist developers trace the spread of malware. As known to those skilled in the art and others, each anti-virus software vendor uses independent standards for identifying and/or publishing software updates to prevent the spread of malware. For example, one anti-virus software vendor may be the first to identify a new malware propagating on the Internet and assign the malware a descriptive name (e.g. "Sasser"). The descriptive name that identifies the malware may be publicized to computer users who obtain a software update designed to neutralize the effects of the malware. Subsequently, additional anti-virus software vendors may identify the same malware. However, since standards do not exist between anti-virus software vendors for identifying and/or publishing software updates to neutralize malware, the newly discovered malware may be given a different name by the subsequent anti-virus software vendors. Obviously, when the same malware has different names, users could face problems trying to identify whether they are protected against the malware. Thus, at block 404, anti-virus software executing on a client computing device may cause additional information to be transmitted to the memory collection server 210 which may include information that assists in confirming the spread of a specific piece of malware regardless of the descriptive names assigned to identify the malware.

In general terms describing one exemplary embodiment of the present invention, the additional information transmitted at block 404 may include data that places the malware into one or several categories. As described previously, many different kinds of malware are created by malicious computer users, including, but certainly not limited to computer viruses, computer worms, Trojan horses, logic bombs, etc. When anti-virus software detects malware on a client computing device, the method 400 receives notice of the detection. Event data may be included in the notice that places the malware into one or several different categories. For example, the event data may indicate that the malware (1) is a virus (i.e. attaches itself to benign program code), (2) is spread as an attachment to an email message and (3) attempts to send additional email messages using an address book associated with an email application program. Each of these characteristics may be used to place the malware into categories which collectively serve to identify the malware.

In one embodiment of the present invention, the additional information transmitted at block 404 may include actual program code identified as being the suspicious data. For any one of a number of reasons, anti-virus software may not categorize characteristics of the malware. In this instance, a manual or automated process may analyze the program code identified as being the suspicious data in order to categorize the program code.

At decision block 406, a test is conducted to determine whether the information collected in the memory collection database 214 indicates that a previously unknown malware attack is targeted at a communication network such as the Internet 212. As known to those skilled in the art and others, malware is becoming more sophisticated and progressively more difficult to detect. To combat new, more sophisticated malware, modern anti-virus software aggressively identifies suspicious data. As a consequence, anti-virus software may generate false positives e.g. instances where data is reported as being suspicious data that is not malware. However, if the memory collection server 210 receives multiple instances where program code exhibits the same characteristics, this provides a strong heuristic indicator that a previously unknown malware attack is targeting computing devices connected to the communication network. For example if the memory collection server 210 receives a significant number (i.e. a thousand or more) reports which categorizes suspicious data in the same way, a previously unknown attack against the communication network is probably occurring.

In an alternative embodiment of the present invention, a specific malware attack on a communication network is identified by an anti-virus software developer that analyzes data received at the memory collection server 210. An experienced anti-virus software developer may identify a malware attack on a communication network by analyzing information previously unavailable to anti-software developers such as minidump files. As described previously, a minidump file captures the memory state of a client computing device when suspicious data is detected. The memory state of the client computing devices as recorded in minidump files may be used for determining whether suspicious data detected by anti-virus software is malware. In any event, if a previously unidentified attack against a communication network such as the Internet 212 is discovered, the method 400 proceeds to block 408 described below. Alternatively, if a previously unidentified attack is not discovered, the method 400 proceeds back to block 402 and blocks 402 through 406 repeat until an attack is discovered.

At block 408, the method 400 obtains program code that implements the attack identified at block 406. As described previously, in one embodiment of the present invention, suspicious data was transmitted to a system that traces the spread of malware in a communication network such as the memory collection server 210 at block 404. In this embodiment, suspicious data now identified as malware was previously obtained by the method 400. However, in other embodiments of the present invention, the program code identified as malware is obtained at block 408. Since existing systems are able to obtain malware program code that is released on a communication network, description of this process is not described in further detail here.

At block 410, a sample data set that describes characteristics of the malware is obtained. In one embodiment of the present invention, the malware program code received at block 408 is used to infect one or more sample computing devices. From these sample computing devices, a set of malware characteristics may be identified. For example, minidump files may be generated from the infected computing devices. In this instance, the minidump files may indicate that the malware (1) is a virus (i.e., attaches itself to benign program code), (2) is spread as an attachment to an email message and (3) attempts to send additional email messages using an address book associated with an email application program.

At block 412, computing devices in a communication network infected with the malware are identified. After the sample data set is obtained at block 410, the method 400 identifies computing devices infected with a specific piece of malware by performing a search of a database. As described previously, software formed in accordance with the present invention maintains a memory collection database 214 (FIG. 2) that stores data associated with client computing devices. The memory collection database 214 may include data that describes the memory state of client computing devices connected to a communication network when suspicious data is detected. In one embodiment of the present invention, the memory collection database 214 is searched for data that is characteristic of the malware. For example, the data set obtained at block 408 that captures the memory state of sample computing devices known to be infected with the malware may be used as key to search the memory collection database 214. Computing devices associated with data characteristic of the malware are identified as being infected. Since a search of a database may be performed using any one of a number of searching techniques generally known in the art, further description of these techniques is not provided here.

As known to those skilled in the art and others, an address such as an Internet Protocol ("IP") address is typically used to identify computing devices connected to a communication network. In the context of the present invention, IP addresses associated with client computing devices are recorded in the memory collection database 214. For example, the IP address of a client computing device may be recorded when data is transmitted to the memory collection database 214 at block 404 in response to receiving notice of suspicious data. At block 412, computing devices in a communication network infected with the malware are identified by their IP address.

At block 414, the spread of malware between client computing devices connected to a communication network is mapped in order to identify the source of the malware. If the time when client computing devices were infected with the malware is known, mapping the spread of the malware may be performed using a sorting algorithm. For example, in one embodiment of the present invention each client computing device identified as being infected with the malware transmits a minidump file to the memory collection database 214 at block 404. The time (i.e. date, hour, minute, second, etc.) when the minidump file was transmitted is recorded. The spread of the malware in a communication network may be traced by sorting when data indicative of an infection was received from each client computing device. For example, minidump files associated with client computing devices and stored in the memory collection database 214 may be sorted based on when the minidump files were received. After the data is sorted, the computing device that was the first to be infected with the malware is easily identified. When the computing device that was the first to be infected is known, the method 400 proceeds to block 416 where it terminates.

The information generated by the method 400 may include the IP addresses of one or more computing devices that were the earliest to be infected with new malware released on a communication network. The IP addresses may be used to identify the malware creator. For example, when the IP address of one or more computing devices that were the earliest to be infected with the malware is known, law enforcement officials may perform an investigation on how these computing devices became infected.

The method 400 as described above has a discrete beginning and end. However, in an actual embodiment of the present invention, the collection of data performed by the memory collection server 210 is a continuous process. Stated differently, the present invention continually obtains data such as minidump files from client computing devices connected to a communication network. When sufficient data exists to believe that a previously unknown malware compromises the security of the communication network, the source of the malware may be identified.

While various aspects of the invention have been illustrated and described, it will be appreciated that various changes can be made therein without departing from the spirit and scope of the invention.

The invention claimed is:

1. A method of identifying the source of a malware that was released onto a communication network, the method comprising:
    (a) obtaining the memory state of a plurality of computing devices connected to the communication network;
    (b) determining that the malware was released onto the communication network;
    (c) identifying computing devices in the communication network that are infected with the malware wherein identifying the computing device includes:
        obtaining program code that implements the malware;
        generating a data set that describes characteristics of the malware from sample computing devices; and
        comparing the data set that describes characteristics of the malware obtained from the sample computing devices with characteristics of the malware as observed in computing devices connected to the comiunication network; and
    (d) tracing the spread of the malware between computing devices infected with the malware.

2. The method of claim 1, wherein obtaining the memory state of a plurality of computing devices connected to the communication network includes:
    (a) receiving notice that suspicious data characteristic of malware is detected in a client computing device connected to the communication network; and
    (b) transmitting data representative of the memory state of the client computing device to a server computing device.

3. The method of claim 2, wherein the notice that suspicious data characteristic of malware is detected in a client computing device connected to the communication network is obtained from an anti-virus software application that makes an application programming interface call when the suspicious data is detected.

4. The method of claim 2, wherein the notice that suspicious data characteristic of malware is detected in a client computing device connected to the communication network includes categorical information about the suspicious data.

5. The method of claim 2, wherein the notice that suspicious data characteristic of malware is detected in a client computing device connected to the communication network includes the suspicious data.

6. The method of claim 2, wherein the memory state of the client computing device transmitted to the server computing device is contained in minidump file.

7. The method of claim 1, wherein determining that the malware was released onto the communication network includes analyzing categorical data obtained from an anti-virus software application and wherein the categorical data describes characteristics of the malware.

8. The method of claim 1, wherein generating a data set that describes characteristics of the malware includes installing the program code that implements the malware on the sample computing devices.

9. The method of claim 1, wherein comparing the data set that describes characteristics of the malware obtained from the sample set of computing devices with characteristics of the malware as observed in computing devices connected to the communication network includes comparing data contained in minidump files.

10. The method of claim 1, wherein tracing the spread of the malware between computing devices infected with the malware includes:
    (a) recording when each client computing device reported suspicious data characteristic of the malware; and
    (b) sorting the client computing devices infected with the malware based on when the suspicious data was reported.

11. A computer-readable medium bearing computer-executable instructions that, when executed, carries out a method of identifying the source of a malware that was released onto a communication network, the method comprising:
    (a) obtaining the memory state of a plurality of computing devices connected to the communication network;
    (b) determining that the malware was released onto the communication network;
    (c) identifying computing devices in the communication network that are infected with the malware wherein identifying the computing devices includes:
        obtaining program code that implements the malware;
        generating a data set that describes characteristics of the malware from sample computing devices; and
        comparing the data set that describes characteristics of the malware obtained from the sample computing devices with characteristics of the malware as observed in computing devices connected to the communication network; and
    (d) tracing the spread of the malware between computing devices infected with the malware.

12. The computer-readable medium of claim 11, wherein obtaining the memory state of a plurality of computing devices connected to the communication network includes:
    (a) receiving notice that suspicious data characteristic of malware is detected in a client computing device connected to the communication network; and
    (b) transmitting data representative of the memory state of the client computing device to a server computing device.

13. The computer-readable medium of claim 12, wherein the notice that suspicious data characteristic of malware is detected in a client computing device connected to the communication network is obtained from an anti-virus software application that makes an application programming interface call when the suspicious data is detected.

14. The computer-readable medium of claim 12, wherein the notice that suspicious data characteristic of malware is detected in a client computing device connected to the communication network includes categorical information about the suspicious data.

15. The computer-readable medium of claim 12, wherein the notice that suspicious data characteristic of malware is detected in a client computing device connected to the communication network includes the suspicious data.

16. The computer-readable medium of claim 12, wherein the memory state of the client computing device transmitted to the server computing device is contained in minidump file.

17. The computer-readable medium of claim 11, wherein determining that the malware was released onto the communication network includes analyzing categorical data obtained from an anti-virus software application and wherein the categorical data describes characteristics of the malware.

18. The computer-readable medium of claim 11, wherein generating a data set that describes characteristics of the malware includes installing the program code that implements the malware on the sample computing devices.

19. The computer-readable medium of claim 11, wherein comparing the data set that describes characteristics of the malware obtained from the sample set of computing devices with characteristics of the malware as observed in computing devices connected to the communication network includes comparing data contained in minidump files.

20. The computer-readable medium of claim 11, wherein tracing the spread of the malware between computing devices infected with time malware includes:
   (a) recording when each client computing device reported suspicious data characteristic of the malware; and
   (b) sorting the client computing devices infected with the malware based on when the suspicious data was reported.

* * * * *

UNITED STATES PATENT AND TRADEMARK OFFICE
CERTIFICATE OF CORRECTION

PATENT NO. : 7,434,261 B2  
APPLICATION NO. : 10/951173  
DATED : October 7, 2008  
INVENTOR(S) : Mihai Costea et al.

Page 1 of 1

It is certified that error appears in the above-identified patent and that said Letters Patent is hereby corrected as shown below:

In column 9, lines 33-34, in Claim 1, delete "conmiunication" and insert -- communication --, therefor.

In column 12, line 6, in Claim 20, delete "time" and insert -- the --, therefor.

Signed and Sealed this  
Third Day of May, 2011

David J. Kappos  
*Director of the United States Patent and Trademark Office*